United States Patent [19]

Roberson

[11] Patent Number: 5,112,535
[45] Date of Patent: May 12, 1992

[54] VEHICLE HAVING A COOLING SYSTEM

[76] Inventor: Joe E. Roberson, 39 Colgate Dr., Rancho Mirage, Calif. 92270

[21] Appl. No.: 579,930

[22] Filed: Sep. 7, 1990

[51] Int. Cl.⁵ ................................................ B01F 3/04
[52] U.S. Cl. ........................................ 261/27; 261/29; 261/106; 261/DIG. 4; 280/DIG. 5
[58] Field of Search ................. 261/DIG. 4, 27, 29, 261/106; 280/DIG. 5

[56] References Cited

U.S. PATENT DOCUMENTS

| | | | |
|---|---|---|---|
| 3,583,174 | 6/1971 | Logue | 261/DIG. 4 |
| 3,709,553 | 1/1973 | Churchill et al. | 280/DIG. 5 |
| 4,026,971 | 5/1977 | Glasoe | 261/DIG. 4 |
| 4,261,930 | 4/1981 | Walker | 261/92 |
| 4,360,368 | 11/1982 | Lyon | 261/DIG. 4 |
| 4,386,038 | 3/1983 | Walker | 261/80 |
| 4,448,593 | 5/1984 | Spiers | 261/27 |
| 4,500,479 | 2/1985 | Fukami et al. | 26/DIG. 4 |
| 4,795,205 | 1/1989 | Gerber | 280/DIG. 5 |
| 4,798,060 | 1/1989 | Long et al. | 62/310 |
| 4,835,982 | 6/1989 | Ferdows | 62/239 |

*Primary Examiner*—Tim Miles
*Attorney, Agent, or Firm*—Flehr, Hohbach, Test, Albritton & Herbert

[57] ABSTRACT

An apparatus for removing heat from warm or hot air and then blowing cooled air into a compartment, such as an occupant compartment, of a vehicle, such as a golf cart, is disclosed. Such an apparatus inlcudes a water recirculating system including a filter means, a pumping means for pumping water through the filter means, drawing means for passing warm or hot air through the filter means and blower means for blowing cooled air into the compartment. Also includes is a means for interrupting power to the pumping means when the vehicle is at an incline so as to avoid spillage of the water from the water recirculating system. An interruption means in the form of a mercury tilt switch is further disclosed.

17 Claims, 6 Drawing Sheets

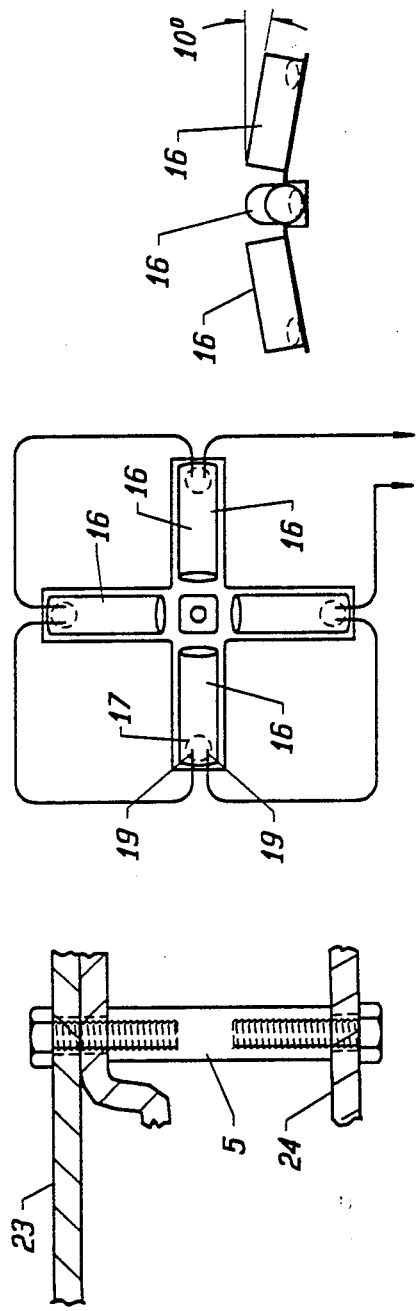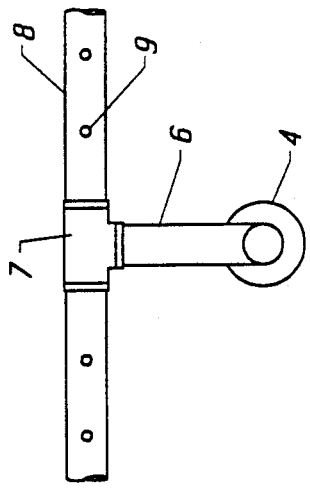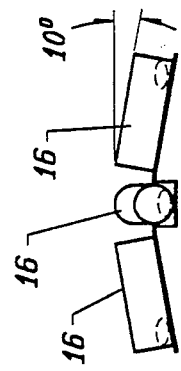
FIG. 6
FIG. 5
FIG. 8
FIG. 4
FIG. 7

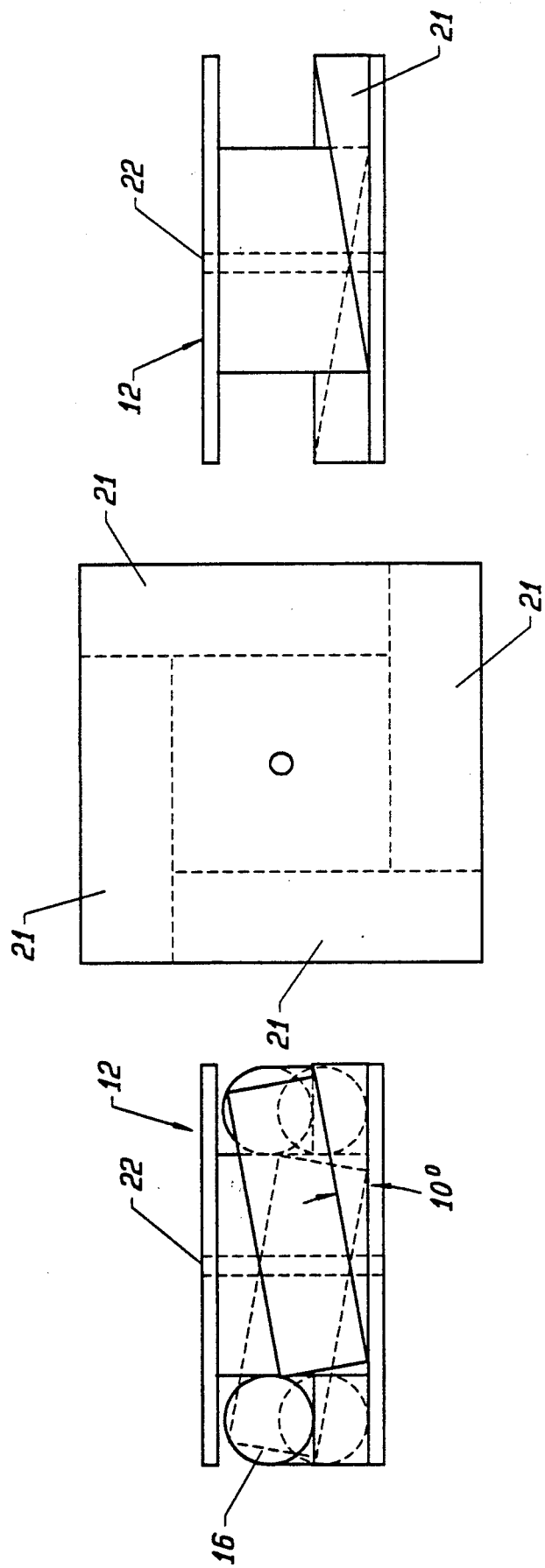

VEHICLE HAVING A COOLING SYSTEM

BACKGROUND OF THE INVENTION

This invention relates to an apparatus for blowing cooled air into an occupant compartment of a vehicle, and more particularly to an evaporative cooling apparatus for blowing cooled air into the occupant compartment of a golf cart.

Evaporative cooling systems provide inexpensive and environmentally sound methods for providing cooled air to passenger compartment of vehicles. Evaporative coolers have been used to cool a variety of types of passenger compartment. For example, U.S. Pat. No. 4,261,930 discloses an evaporative cooler which may be mounted atop the personnel cab of an agricultural machine. U.S. Pat. No. 3,583,174 discloses an evaporative cooler which may be mounted atop a vehicle cab and U.S. Pat. No. 4,798,060 discloses a portable evaporative cooler for use in a motor vehicle, travel trailer or other movable structures. Furthermore, U.S. Pat. No. 4,835,982 discloses an evaporative cooler for use atop a bus.

Each of the aforementioned evaporative coolers will leak or spill water upon an incline or descent, and therefore are not useful for a vehicle which is being driven on non-horizontal or uneven terrain. This leakage or spillage occurs because the filter which is saturated with water and through which the air flows through must be unenclosed in order to allow for the evaporative cooling effect. In saturating the filter, excess water will necessarily accumulate and will need to be channeled to a reserve tank. It is usually when the excess water is being channeled that leakage or spillage occurs as the vehicle ascends or descends. Golf carts are vehicles which frequently travel on uneven terrain and therefore, the aforementioned evaporative coolers would not function properly under the driving circumstances of golf carts.

It is an object of this invention to provide an evaporative cooler which can be used as an air cooler for the passenger compartment of a vehicle which typically travels on non-horizontal terrain, such as golf carts, as well as a cooler for all types of vehicles.

The passenger compartments of golf carts are generally designed to seat two passengers and therefore, the roofs of golf carts are generally designed to cover two people. Accordingly, an evaporative cooler for golf cart passenger compartments must be horizontally compact enough to be housed on a golf cart's roof. Moreover, many golfers live in houses which border golf courses and therefore those golfers may park their golf carts in their garages. Accordingly, an evaporative cooler must be vertically compact enough to pass through a standard height garage door. Furthermore, because there is limited space on a golf cart roof or otherwise on the golf cart, the system must be self contained, that is, it must occupy very little space while being able to contain enough water to provide cooled air for a sufficiently long duration of time.

It is therefore an object of the instant invention to provide an evaporative cooling apparatus sufficiently self contained and compact enough for mounting atop a golf cart roof.

It is a further object of the instant invention to provide a compact self-contained evaporative cooling apparatus for other types of passenger or cargo compartments, partially or fully enclosed, as well.

SUMMARY OF THE INVENTION

The present invention is an apparatus for removing heat from warm or hot air and then blowing cooled air into a compartment, such as an occupant compartment, of a motorized vehicle, such as a golf cart, a boat or a camper shell. More specifically, an evaporative cooler is mounted onto the roof of a golf cart's occupant compartment. Such an evaporative cooler is comprised of a water recirculating system which, in turn, is comprised of a filter where water comes into contact with warm or hot air, a pump which pumps water through the filter, a suction device which draws the hot air through the filter and a blower which forces the resultant cooled air into the occupant compartment.

The cooler of the present invention is an evaporative cooler. The filter in such a cooler is not completely enclosed and therefore the water in the filter is not completely contained. The pump which pumps water from the reservoir through the filter generally pumps more water than the filter can contain. The excess water which has not evaporated on contact with the warm or hot air is returned to the reservoir through holes between the filter housing and the reservoir.

Commonly, as a motorized vehicle is engaged in travel, it will encounter inclines or declines in its path and therefore will not remain completely horizontal. As the motorized vehicle ascends or descends, the cooling apparatus will also undergo an ascent or descent. When the incline is approximately ten degrees or more, the water in the water recirculating system in the preferred embodiment will tend to spill out of the cooling apparatus, generally from the filter or filter housing area. In order to avoid the water spillage upon inclines or declines, the power to the pump is interrupted when the vehicle ascends or descends, thereby shutting off the pump. When the pump is off, excess water in the filter is minimized, and spillage is therefore minimized or eliminated.

The power interruption to the pump is caused by a switch which is in series with the pump and which opens when the vehicle ascends or descend at an incline or decline. The incline or decline from the horizontal may be in any direction. In the preferred embodiment of the cooling apparatus described herein, the switch is utilized when the incline or decline is of approximately ten degrees or more. However, in a different embodiment of the instant invention the switch may be utilized when the incline or decline is more or less than approximately ten degrees.

The switch in the preferred embodiment is a mercury tilt switch, however, other types of switches are also possible. It is not the intent of this description to limit the types of switches which may be used to interrupt power to the pump.

A mercury tilt switch utilizes a plurality of mercury switches, each of which is supported at an incline from the horizontal approximately equal to the incline at which it is desired the power to the pump be interrupted. The mercury switches are arranged so that at an incline in any direction, the power will be interrupted. Each of the mercury switches' mercury ends are pointed toward the lower end of the incline. The mercury switches are connected in series, therein comprising the mercury tilt switch. The pump power source is connected in series to .the mercury tilt switch which is in turn connected in series to the pump. When the motorized vehicle travels up an incline or descends down at approximately ten degrees or more in any direction, the mercury at the end of one or more of the mercury switches moves away from the end of the mercury switch causing there to be a break in the circuit. In other words, the switch is opened and therefore the power to the pump is interrupted.

The mercury tilt switch described herein utilizes a plurality of mercury switches which may be configured in a number of different ways. In the preferred embodiment the mercury tilt switch utilizes four mercury switches arranged in a quadrilateral configuration. However, the four mercury switches may also be configured such that each of the ends of the four mercury switches meet each of the ends of the other mercury switches. Although the preferred embodiment utilizes four mercury switches, any number of mercury switches may be used as this description herein is not intended to limit the number of mercury switches used or as a limit to their configuration.

This invention may be utilized on any motorized vehicle with a power source sufficient to power the apparatus. The compartment to be cooled may be partially or completely open or completely enclosed. The compartment to be cooled may be a human occupant compartment, a non-human compartment such as a horse trailer, or a cargo compartment. It is not the intent of the foregoing description to limit the type of motorized vehicle utilized in this invention. Accordingly, it is to be understood that while a preferred embodiment of the invention has been herein set forth and described, modifications and changes may be made therein without departing from the spirit and the scope of the invention as defined by the appended claims.

Other objects, advantages and features of the present invention will become more readily appreciated and understood when taken together with the following detailed description in conjunction with the accompanying drawings.

The object of this invention to provide an evaporative cooler which can be used as an air cooler for the passenger compartment of a vehicle which typically travels on non-horizontal terrain, such as golf carts, as well as a cooler for all types of vehicles is fulfilled by the instant invention.

Moreover, the object of the instant invention to provide an evaporative cooling apparatus sufficiently self contained and compact enough for mounting atop a golf cart roof is fulfilled by the instant invention.

Furthermore, the object of the instant invention to provide a compact self-contained evaporative cooling apparatus for other types of passenger or cargo compartments, partially or fully enclosed, is also fulfilled by the instant invention.

BRIEF DESCRIPTION OF THE DRAWINGS

FIG. 4 is a fragmentary side view of cross section of the support rods separating the upper and lower trough structures.

FIG. 5 shows a top view of an embodiment of the mercury tilt switch of the present invention.

FIG. 6 shows a side view of the mercury switch in FIG. 5.

FIG. 7 shows a circuit diagram of the connection of the mercury tilt switch of the present invention which when open, disconnects the pump of the evaporative cooler apparatus from its power supply and when closed, connects the pump to its power supply.

FIG. 8 shows a fragmentary side view of the water delivery system as shown in FIG. 3.

FIG. 9 shows a side view of another embodiment of the mercury tilt switch of the present invention.

FIG. 10 shows a top view of the mercury tilt switch of FIG. 9.

FIG. 11 shows a side view of a ramp configuration of the housing of the mercury tilt switch of FIG. 9.

DETAILED DESCRIPTION OF THE PREFERRED EMBODIMENTS

The evaporative cooler of the instant invention is designed to be mounted atop a golf cart roof and to direct cooled air into the passenger compartment of a golf cart while the golf cart is being used in its normal fashion, that is, ascending and descending along a golf course. As stated above, evaporative coolers of the prior art would not be functional for golf carts due to the spillage and leakage of water on ascents and descents.

Figure 1:
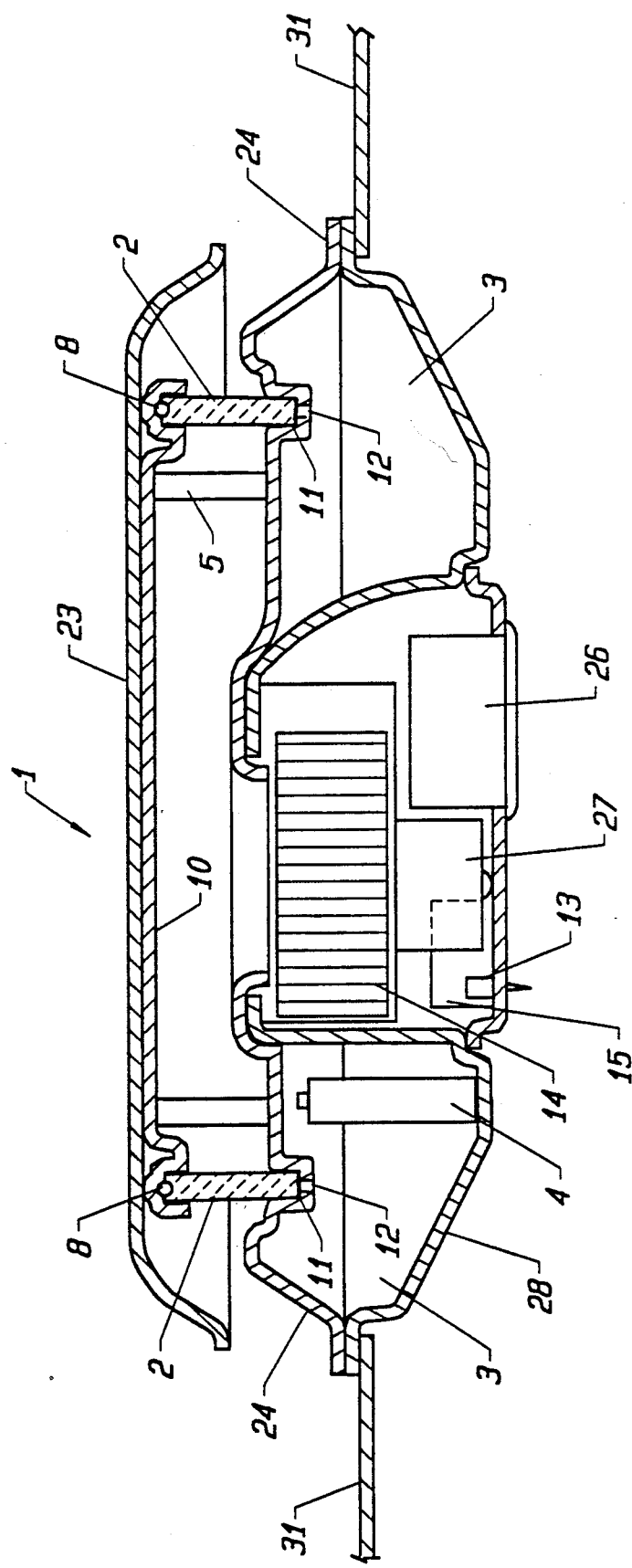
FIG. 1 shows a side view cross section of the present invention.

FIG. 1 shows a side view cross section of the evaporative cooler 1 of the present invention. Air is drawn through filter 2 which is saturated by water. The drawing means is the air intake of the blower which ultimately blows air into the passenger compartment. Filter 2 is made of a material which is preferably water wettable and of perforated paper construction which renders the filter transparent to the flow of air. FIG. 8 shows a fragmentary side view of the water delivery system as partially shown in FIGS. 1, 2 and 3. The water is pumped from the reservoir 3 by submersible pump 4 through tube 6 and fitting tee 7 and fed along perforated tube 8. The water then is distributed to filter 2 by holes 9 along perforated tube 8.

Figure 3:
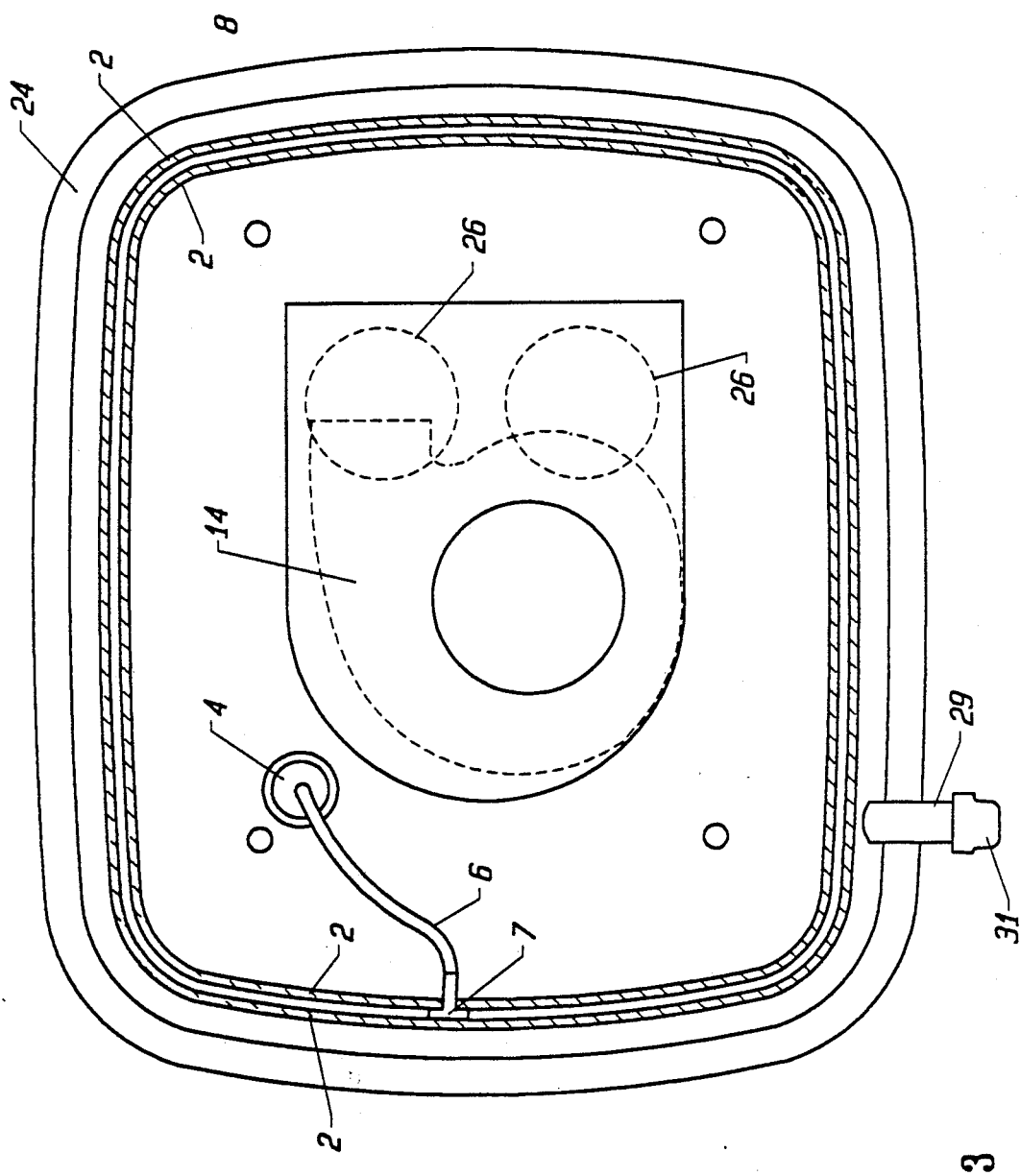
FIG. 3 shows a top view of the present invention, with the top member and filter support removed.

FIG. 3 which depicts a top view of the present invention, with the top member and filter support removed shows the perforated tube 8 positioned along one edge of filter 2. Returning to FIG. 1, there it is also shown that perforated tube 8 is placed along filter 2, so that the water drains from holes 9 onto filter 2. Of course, there are many other ways for positioning water on a filer such that some water makes contact with warm or hot air. For example, water could be sprayed onto the filter.

The filter 2 should be saturated with water for the maximum evaporative effect. However, by saturating filter 2 with water, there will necessarily be excess water which must be returned to the reservoir 3. Filter 2 sits in an upright and stable position between one troughs of indentation member 10 and trough 11. Water will generally accumulate in the trough 11 in which the filter's edge rests in this preferred embodiment. Trough 11 is positioned above the reservoir 3. Trough 11 has filter trough holes 12 through which the water flows back into the reservoir 3. However, at any given time during the operation of the preferred embodiment, water will accumulate in the trough 11 while the water drains back into the reservoir 3. It is at this juncture in the evaporative cooling process where leakage and spillage may occur if the cooling apparatus is tilted such that the water does not remain contained in the trough 11.

In order to avoid spillage or leakage from the cooling apparatus upon tilting, this invention includes interruption means, that is, in the preferred embodiment, a mercury tilt switch 12 which opens a switch which is connected in series with the pump 4 when the tilt of the apparatus reaches a predetermined magnitude. Referring to FIG. 7, the circuit diagram shows the connection of the mercury tilt switch 12 of the present invention which when open, disconnects the pump of the evaporative cooler apparatus from its power supply and when closed, connects the pump to its power supply. In the preferred embodiment, the interruption means interrupts the power to the pump when the mercury switch is tilted ten degrees. However, depending upon the configuration of the cooling apparatus, the interruption means may be configured to interrupt the power to the pump upon a tilting of more than ten degrees or less than ten degrees.

FIG. 7 shows a power supply of 12 Volts, which is typical for battery operated golf carts. However, some golf carts are powered by different magnitudes and different types of power sources, such as by gasoline or by both gasoline and electricity in combination, and therefore. On/off switch 13 controls the power supply to the entire cooling apparatus. The main electrical components in the instant invention, are of course, the blower 14 which provides both drawing and blowing means in this preferred embodiment, and the pump 4. Other electrical components may be added as seen necessary for variations on the preferred embodiment. Blower 14 and pump 4 are connected in parallel, and together are in series with on/switch 13.

Mercury tilt switch 12, when tilted to a predetermined magnitude, opens, and thusly shuts off the power supply to the pump 4. When pump 4 stops pumping water onto filter 2, water ceases collecting in trough 11, and therefore, there is no water accumulating in trough 11 to leak or spill out of trough 11.

Because, in this preferred embodiment, the pump 4 and the blower 13 are connected in parallel, when the pump 4 shuts off due to the mercury tilt switch 12 opening, blower 13 does not shut off as well. Blower 13 continues to draw air through the filter 2, and as long as there is water left in the filter 2, the evaporative effect will continue, and cooled air will be blown into the passenger compartment, preferably by a high velocity squirrel-cage blower. However, any other blower means which is of sufficiently high velocity may be utilized.

Table I which follows shows that when the temperature is 102° F., the relative humidity is 28%, and the evaporative cooler apparatus of the instant invention has cooled the passenger compartment of a golf cart to 80° F., when the pump is turned of while the blower is functioning, it takes nine minutes for the temperature of the passenger compartment to raise eleven degrees. Table II which also follows shows that once the pump 2 has been restarted, the temperature of the passenger compartment, starting at 91° F. after three minutes.

TABLE I

Place: Rancho Mirage, CA
Time: 12:30 PM
Date: July 28, 1990
Dry Ball: 102° F.
Wet Ball: 76° F.
Relative Humidity: 28%

| Minutes | Passenger Compartment Temperature |
|---|---|
| 0 | 80 |
| 1 | 79 |
| 2 | 79 |
| 3 | 79 |
| 4 | 80 |
| 5 | 81 |
| 6 | 84 |
| 7 | 83 |
| 8 | — |
| 9 | 91 |

TABLE II

| Minutes | Passenger Compartment Temperature |
|---|---|
| 0 | 91 |
| 1 | 85 |
| 2 | 84 |
| 3 | 83 |

Tables I and II shows that once the pump has been disengaged, the blower 14 continues to direct cooled air into the passenger compartment. The above measurements are greatly dependent upon the relative humidity. Of course, in a dryer climate, the evaporative effect is more accelerated than in a more humid climate, and therefore the filter 1 would dry out faster. In the preferred embodiment, cooled air continues to blow for at least five minutes after the interruption means interrupts power supplied to the pumping means.

Mercury tilt switch 12 can take many forms. The mercury tilt switch 12 of the present invention is a plurality of mercury switches connected in series. In this preferred embodiment, the mercury tilt switch 12 is connected in series to the pump 4 and the means for supplying power to the pump 4. The object is to set up a switch, which when tilted to a predetermined magnitude, opens. In the preferred embodiment, as shown in FIG. 5, a plurality of mercury switches 16 which by support means, for example, a linear ramp, are placed at angles to one another, and at angles to the horizontal.

A mercury switch is an available item which is composed of a tube with a drop of mercury 17 inside of the tube. One end, the electrical lead end 18 of the tube, has electrical leads 19. When the mercury drop 16 is touching both leads 19, a circuit is created. The mercury drop 17 is free to move within the tube. So, as long as the electrical lead end 18 is pointed down, and the mercury drop 17, under the force of gravity, is at the lowest end of the tube of the mercury switch 16, the circuit is closed.

When the mercury switch tube is moved so that the drop of mercury 17 leaves moves from the electrical lead end 18, the circuit is broken and the power to the pump 4 is discontinued. The magnitude of the incline from the horizontal of the mercury switch tube 16 determines at what angle the cooling apparatus must be in order to break the circuit of the mercury tilt switch. Preferably, the mercury switch is supported at an angle of 10 degrees from the horizontal; however, this angle is adjustable to any angle which is desired.

The plurality of mercury switches are combined in an arrangement such that if the apparatus is tilted in any direction beyond the predetermined angular magnitude from the horizontal, the mercury tilt switch is opened. Turning to FIG. 6, there is a side view of one quadrilateral configuration of the mercury tilt switch where there are four tubes 16, each forming an angle of 90 degrees to an adjacent mercury switch tube. Turning to FIG. 9, there it is shown a side view of another quadrilateral configuration wherein one end of each of the mercury switch tubes 16 meets one end of each of the other mercury switch tubes 16.

FIG. 10 shows a top view of the support means for the same quadrilateral configuration of FIG. 9. Preferably, the support means is a set of linear ramps 21. However, other support means can be envisioned, for example, where the tubes are suspended from a suspension means. FIG. 11 shows the same support means of FIG. 10 from a side view with linear ramps 21. Hole 22 located in the center of the mercury tilt switch 12 for receiving a mounting screw to mount the same within the cooling apparatus.

The mercury tilt switch configuration can take many forms which will ultimately provide the desired result of opening the circuit upon tilting the apparatus. Preferably, the mercury tilt switch 12 provides its switching function when tilted in any direction. In this embodiment, this is achieve by the angles formed between each of the mercury tubes 16 and an adjacent mercury tube 16 when summed being 360 degrees.

Other interruption means can be envisioned which operate on different principles than those disclosed herein, for example, a manual switch or a light sensitive switch. Nothing in this disclosure is intended to limit the scope of the claims of instant invention.

Returning to FIG. 1, the cooling apparatus is depicted therein. The air essentially enters the cooling apparatus through the space between the top cover 23 and the upper half of the water reservoir 24. As stated above, the air passes through filter 2, drawn by blower 14. When the filter 2 contains water, water will evaporate and loose heat. The cooled air is drawn through blower 14 and is passed through directional vents 26 which direct the air into the passenger compartment. In the preferred embodiment, two directional vents are utilized, however, more or less may also be used. The blower 14 is powered by blower fan motor 27.

Figure 2:
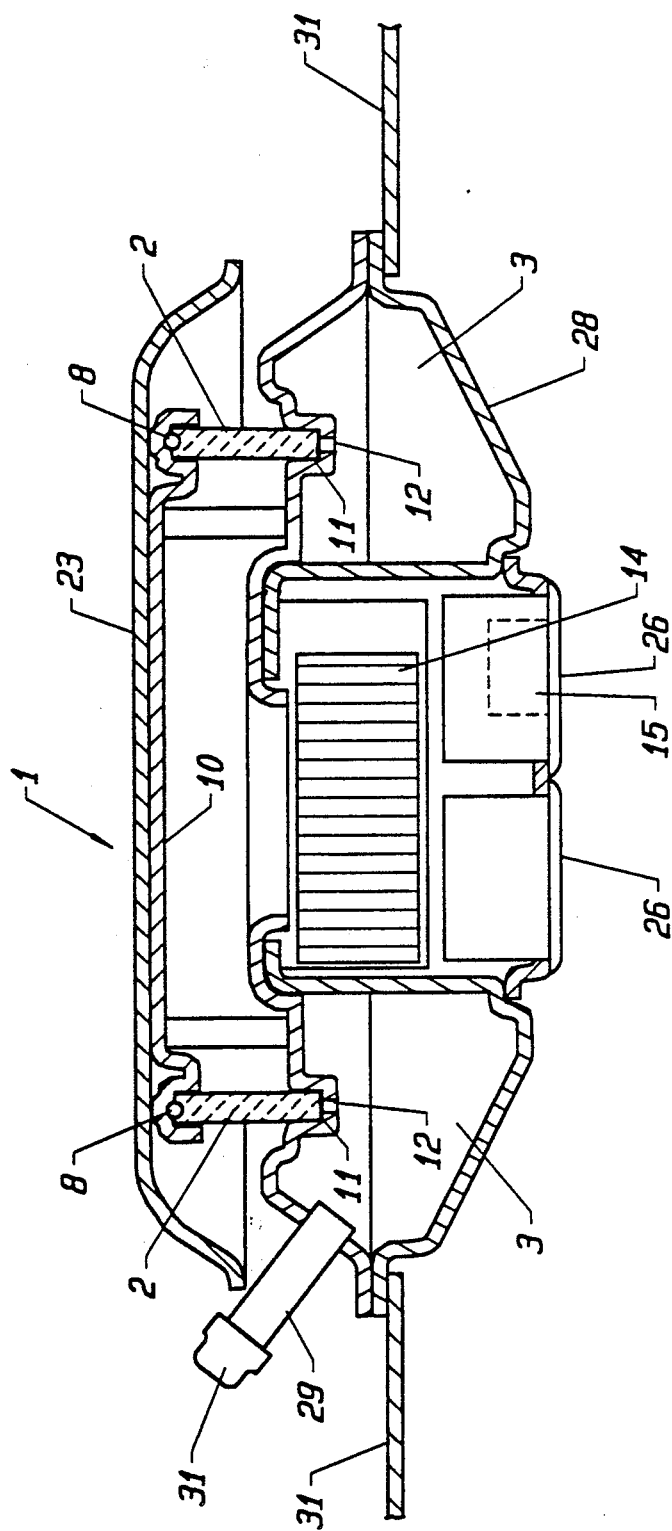
FIG. 2 shows an end view cross section of the present invention.

The water reservoir 3 is enclosed by the upper half of the water reservoir 24 and the lower half of the water reservoir 28. In the preferred embodiment, the water reservoir 3 tank is designed to permit a 30 degree tilt without the water contained therein, overflowing. The water reservoir 3, in keeping with the object of providing a compact cooling apparatus, is integral to the unit and is capable of containing sufficient water to operate the cooler for approximately 2 to 3 hours, depending upon the relative humidity, which is adequate for a typical round of golf. FIG. 2, which depicts an end view cross section of the present invention, shows the inlet tube 29 with inlet tube spout 31 for filling water reservoir 3. A float valve may be incorporated into the inlet tube 29 or the spout 31 for regulating the amount of water added to the reservoir 3.

Figure 12:
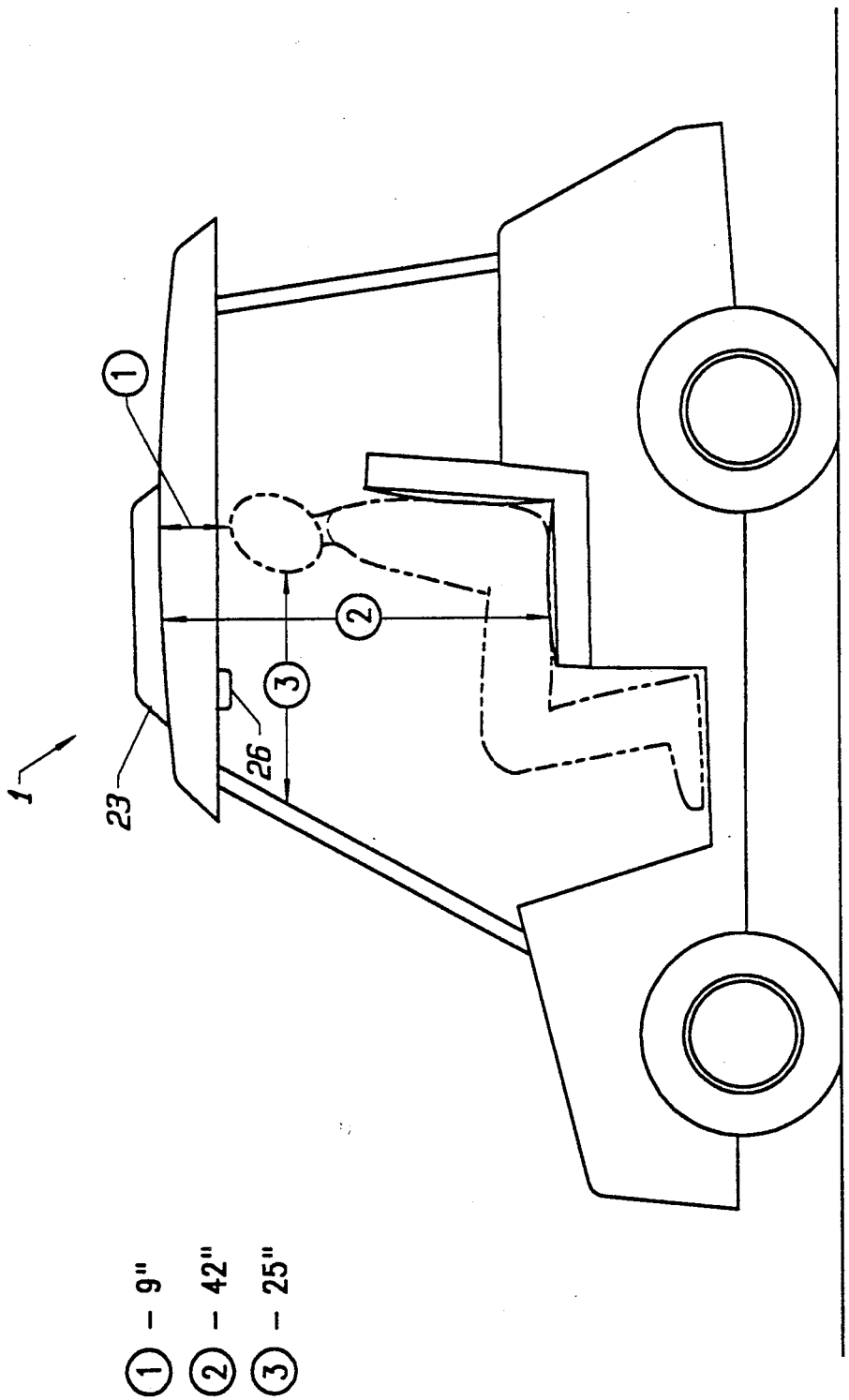
FIG. 12 shows a side view of the present invention mounted on a golf cart.

In keeping with the above stated object of the present invention, that is, to provide an evaporative cooling apparatus sufficiently self contained and compact enough for mounting atop a golf cart roof, FIG. 12 depicts a cooling apparatus with a maximum profile of four inches from the roof of the golf cart. The cooling apparatus may be mounted to the top of the golf cart by mounts 31 depicted in FIG. 3 or any other suitable means. Furthermore, the cooling apparatus of the instant invention can be built into a roof unit, completely integrated upon original manufacture.

The present invention may be used as a cooling apparatus for any type of vehicle compartment. This includes occupant and non-passenger compartments which are open, enclosed or partially enclosed. Furthermore, this include other types of vehicles such as boats, campers, agriculture vehicles, motorcycle sidecars, trains, buses, automobiles, and conceivably airplanes and helicopters. It is not the intended function of this description to limit the scope of the claims.

Accordingly, it is to be understood that while a preferred embodiment of the invention has been herein set forth and described where as modifications and changes may be made therein without departing from the spirit and scope of the invention as defined by the annexed claims.

What is claimed is:

1. In combination, a golf cart and an apparatus mounted on said golf cart for removing heat from warm or hot air and then blowing cooled air into the occupant compartment of said golf cart, comprising:
   a water recirculating system having a reservoir for containing water comprising:
   a. filter means for positioning water such that some water makes contact with warm or hot air;
   b. pumping means for pumping water from said reservoir through said filter means;
   c. drawing means for passing warm or hot air through said filter means such that as warm or hot air passes through said filter means, contact is made between water and warm or hot air, wherein warm or hot air looses heat due to water evaporation and cooler air results; and
   d. blower means for blowing resultant cooled air into said compartment of said golf cart; and
      interruption means for automatically interrupting power to said pumping means when said golf cart is tilted from the horizontal in any direction.

2. An apparatus as recited in claim 1 wherein said blower means for blowing resultant cooled air into said compartment of said golf cart is a high velocity blower.

3. An apparatus as recited in claim 1 wherein said blower means continues to blow cooled air for a period of time after said interruption means interrupts power supplied to said pumping means.

4. An apparatus as recited in claim 1 wherein said interruption means is a switch which is in series with said pumping means and upon said golf cart being tilted, said switch is open.

5. An apparatus as recited in claim 4 wherein said switch is opened upon said golf cart being tilted approximately ten degrees or more.

6. An apparatus as recited in claim 1 wherein said interruption means is a mercury tilt switch.

7. An apparatus as recited in claim 6 wherein said mercury tilt switch comprises:
   a plurality of mercury switches;
   support means for supporting said mercury switches;
   each of said mercury switches' mercury end being pointed toward the lower end of said incline from the horizontal; and
   power means connected to the mercury end of a first of said mercury switches, said power means in turn connected in series to the remaining mercury switches and then to said pumping means.

8. An apparatus as recited in claim 7 wherein said support means is a linear ramp.

9. An apparatus as recited in claim 7 wherein each of said mercury switches is linear.

10. An apparatus as recited in claim 7 wherein said support means provides said mercury switches with an include of approximately ten degrees from the horizontal.

11. An apparatus as recited in claim 7 wherein each of said mercury switches forms an angle with an adjacent mercury switch.

12. An apparatus as recited in claim 11 wherein the angle formed between each of said mercury switches and said adjacent mercury switch when summed, totals 360 degrees.

13. An apparatus as recited in claim 7 wherein said plurality of mercury switches is four mercury switches.

14. An apparatus as recited in claim 13 wherein each of said four mercury switches is at an incline of approximately ten degrees from the horizontal.

15. An apparatus as recited in claim 13 wherein each of said four mercury switches forms an angle with an adjacent mercury switch of 90 degrees.

16. An apparatus as recited in claim 15 wherein said mercury switches form a quadrilateral configuration.

17. An apparatus as recited in claim 15 wherein one end of each of said mercury switches meets one end of each of the other mercury switches.

* * * * *